US012802136B2

(12) United States Patent
Palmero et al.

(10) Patent No.: US 12,802,136 B2
(45) Date of Patent: Nov. 17, 2026

(54) OIL AND GAS EXPLORATION PORTFOLIO OPTIMIZATION WITH GEOLOGICAL, ECONOMICAL, AND OPERATIONAL DEPENDENCIES

(71) Applicant: Saudi Arabian Oil Company, Dhahran (SA)

(72) Inventors: Pablo Zapico Palmero, Dhahran (SA); Luis Gerardo Escalona Delgado, Dhahran (SA); Santiago Ariel Ganis, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 18/639,171

(22) Filed: Apr. 18, 2024

(65) Prior Publication Data

US 2024/0265461 A1 Aug. 8, 2024

Related U.S. Application Data

(63) Continuation-in-part of application No. 17/512,135, filed on Oct. 27, 2021, now abandoned.

(51) Int. Cl.
*G06Q 40/00* (2023.01)
*G06Q 40/06* (2012.01)

(52) U.S. Cl.
CPC .................................... *G06Q 40/06* (2013.01)

(58) Field of Classification Search
CPC .... G06Q 40/06; G06Q 10/04; G06Q 10/0631; G06Q 10/06313; G06Q 10/06375;
(Continued)

(56) References Cited

U.S. PATENT DOCUMENTS 7,467,044 B2 12/2008 Tran et al.
7,835,893 B2 11/2010 Cullick et al.
(Continued)

FOREIGN PATENT DOCUMENTS

CN 106501854 A 3/2017
CN 107038491 A 8/2017
CN 109558615 A 4/2019

OTHER PUBLICATIONS

Smyth, John , Rusin, Piotr, Garcia, Jhairo , and Stan Cullick. "Rapid Optimization of Development Scenarios for Multiple Exploration Prospects Using an Integrated Asset Model." Paper presented at the SPE Latin American and Caribbean Petroleum Engineering Conference, Lima, Peru (Year: 2010).*
(Continued)

*Primary Examiner* — Beth V Boswell
*Assistant Examiner* — Tyrone E Singletary
(74) *Attorney, Agent, or Firm* — Dinsmore & Shohl LLP

(57) ABSTRACT

In accordance with one embodiment of the present disclosure, a method includes receiving exploration constraints, including a budget, receiving prospect inputs for a plurality of prospects, each prospect input having fixed inputs and dynamic inputs, generating correlation matrices based on the dynamic inputs, determining a set of drilling sequences for the plurality of prospects based on the budget, modeling, by Monte Carlo simulation, each drilling sequence of the set of drilling sequences within the prospect inputs, wherein each iteration of modeling is complete when the exploration constraints are reached, and generating an optimal drilling sequence, including a risk and a reward for the optimal drilling sequence.

18 Claims, 11 Drawing Sheets

(58) Field of Classification Search
CPC ...... G06Q 10/067; G06Q 50/02; G01V 20/00; G06F 2111/08; G06F 2111/10; G06F 2119/22; G06F 17/18; G06F 30/20; G06F 17/11; E21B 2200/20
See application file for complete search history.

(56) References Cited

U.S. PATENT DOCUMENTS

| | | | | |
|---|---|---|---|---|
| 8,577,613 | B2 | 11/2013 | Bryant et al. | |
| 9,194,968 | B2 | 11/2015 | Imhof et al. | |
| 10,400,596 | B2 | 9/2019 | Lawson et al. | |
| 10,678,967 | B2 * | 6/2020 | Babin | G06F 30/20 |
| 10,767,471 | B2 | 9/2020 | Olsen et al. | |
| 2012/0317478 | A1 * | 12/2012 | Hantschel | G01V 99/00 715/255 |
| 2013/0311147 | A1 | 11/2013 | Greenwood | |
| 2016/0018550 | A1 * | 1/2016 | Martinelli | G01V 1/30 702/14 |
| 2016/0047942 | A1 | 2/2016 | Chorn et al. | |
| 2016/0260180 | A1 | 9/2016 | Vasquez et al. | |
| 2021/0048556 | A1 * | 2/2021 | Sun | G06F 17/153 |
| 2021/0081857 | A1 | 3/2021 | Patino Virano et al. | |
| 2021/0150440 | A1 | 5/2021 | Pang et al. | |

OTHER PUBLICATIONS

Bickel et al. "Optimal Sequential Exploration: A Binary Learning Model" Decision Analysis vol. 3, No. 1, Mar. 2006, pp. 16-32, 18 pgs.
Binns "Evaluating subtle stratigraphic traps: prospect to portfolio" The Deliberate Search for the Stratigraphic Trap. Geological Society, London, Special Publications, 254, 7-26, 2016, 20 pgs.
Jafarizadeh et al. "Sequential Exploration: Valuation with Geological Dependencies and Uncertain Oil Prices" SPE Journal, Jul. 2020, 31 pgs.
Jafarizadeh "Exploration of Correlated Prospects and Possible Joint Development Solutions" Conference Paper, Dec. 2020, 9 pgs.
Lima "The Impact of Dependency Analysis on Prospect Ranking and Portfolio Evaluation: A Case Study in Offshore Brazil" Master of Science in Energy and Earth Resources, Aug. 2017, 71 pgs.
Martinelli "Dynamic Decision Making for Graphical Models Applied to Oil Exploration" Norwegian University of Science and Technology, Dec. 2011, 23 pgs.
Martinelli et al. "Bayesian networks for prospect analysis in the North Sea" AAPG Bulletin, V. 95, No. 8 (Aug. 2011), pp. 1423-1442, 20 pgs.
Second Examination Report dated Apr. 28, 2024, pp. 1-7, received in corresponding Saudi Arabian Application No. 122440445.

* cited by examiner

| | | | | | | | | | | | | | | |
|---|---|---|---|---|---|---|---|---|---|---|---|---|---|---|
| 402 | Pre Rift | Pre Rift | Pre Rift | Syn Rift | Pre Rift | Syn Rift | Syn Rift | Pre Rift | Pre Rift | Syn Rift | Pre Rift | Pre Rift | Pre Rift | Syn Rift |
| 404 | Prospect 1 | Prospect 2 | Prospect 3 | Prospect 4 | Prospect 5 | Prospect 6 | Prospect 7 | Prospect 8 | Prospect 9 | Prospect 10 | Prospect 11 | Prospect 12 | Prospect 13 | Prospect 14 |
| | | | | | | | | | | | | | | |
| 406 | 0.9 | 0.9 | 0.8 | 0.7 | 0.8 | 0.6 | 0.7 | 0.8 | 0.8 | 0.7 | 0.8 | 0.6 | 0.6 | 0.6 |
| 408 | 0.6 | 0.6 | 0.6 | 0.5 | 0.6 | 0.5 | 0.5 | 0.7 | 0.6 | 0.5 | 0.5 | 0.5 | 0.5 | 0.4 |
| 410 | 0.8 | 0.9 | 0.9 | 0.9 | 0.9 | 0.8 | 0.8 | 0.6 | 0.7 | 0.8 | 0.9 | 0.9 | 0.9 | 0.9 |
| 412 | 0.9 | 0.9 | 0.9 | 0.8 | 0.7 | 0.8 | 0.7 | 0.9 | 0.8 | 0.7 | 0.7 | 0.7 | 0.7 | 0.7 |
| 414 | 39% | 44% | 39% | 22% | 30% | 19% | 20% | 30% | 27% | 39% | 25% | 19% | 19% | 15% |
| | | | | | | | | | | | | | | |
| | | | | | | | | | | | | | | |
| | | | | | | | | | | | | | | |
| | | | | | | | | | | | | | | |
| | | | | | | | | | | | | | | |
| | | | | | | | | | | | | | | |
| | | | | | | | | | | | | | | |
| | | | | | | | | | | | | | | |
| | | | | | | | | | | | | | | |
| 416 | 7 | 6 | 9 | 10 | 8 | 8 | 11 | 7 | 4 | 8 | 7 | 7 | 10 | 9 |
| | 25 | 20 | 22 | 60 | 25 | 40 | 35 | 45 | 26 | 60 | 30 | 50 | 45 | 55 |
| | 90 | 75 | 80 | 200 | 95 | 225 | 180 | 130 | 100 | 210 | 95 | 175 | 225 | 400 |
| 417 | West Basin | West Basin | West Basin | West Basin | West Basin | Central Basin | Central Basin | Central Basin | Central Basin | Central Basin | Central Basin | East Basin | East Basin | East Basin |
| | | | | | | | | | | | | | | |
| 418 | Onshore | Onshore | Onshore | Onshore | Onshore | Onshore | Onshore | Onshore | Onshore | Onshore | Onshore | Onshore | Onshore | Onshore |
| | | | | | | | | | | | | | | |
| 420 | Gas | Gas | Gas | Gas | Gas | Gas | Gas | Gas | Gas | Gas | Gas | Oil | Oil | Oil |

FIG. 4A

500

| Geological Correlation Success | Prospect 1 | Prospect 2 | Prospect 3 | Prospect 4 | Prospect 5 | Prospect 6 | Prospect 7 | Prospect 8 | Prospect 9 | Prospect 10 | Prospect 11 | Prospect 12 | Prospect 13 | Prospect 14 |
|---|---|---|---|---|---|---|---|---|---|---|---|---|---|---|
| Prospect 1 | | 0.04 | 0.04 | 0 | 0.02 | 0 | 0 | 0.01 | 0.01 | 0 | 0.01 | 0 | 0 | 0 |
| Prospect 2 | | | 0.04 | 0 | 0.02 | 0 | 0 | 0.01 | 0.01 | 0 | 0.01 | 0 | 0 | 0 |
| Prospect 3 | | | | 0 | 0.02 | 0 | 0 | 0.01 | 0.01 | 0 | 0.01 | 0 | 0 | 0 |
| Prospect 4 | | | | | 0 | 0.04 | 0.04 | 0 | 0 | 0.04 | 0 | 0 | 0 | 0.02 |
| Prospect 5 | | | | | | 0 | 0 | 0.01 | 0.01 | 0 | 0.01 | 0 | 0 | 0 |
| Prospect 6 | | | | | | | 0.08 | 0 | 0 | 0.06 | 0 | 0 | 0 | 0.04 |
| Prospect 7 | | | | | | | | 0 | 0 | 0.06 | 0 | 0 | 0 | 0.04 |
| Prospect 8 | | | | | | | | | 0.04 | 0 | 0.04 | 0.02 | 0.02 | 0 |
| Prospect 9 | | | | | | | | | | 0 | 0.04 | 0.02 | 0.02 | 0 |
| Prospect 10 | | | | | | | | | | | 0 | 0 | 0 | 0.04 |
| Prospect 11 | | | | | | | | | | | | 0.02 | 0.02 | 0 |
| Prospect 12 | | | | | | | | | | | | | 0.04 | 0 |
| Prospect 13 | | | | | | | | | | | | | | 0 |
| Prospect 14 | | | | | | | | | | | | | | |

FIG. 5A

502

| Geological Correlation Success | Prospect 1 | Prospect 2 | Prospect 3 | Prospect 4 | Prospect 5 | Prospect 6 | Prospect 7 | Prospect 8 | Prospect 9 | Prospect 10 | Prospect 11 | Prospect 12 | Prospect 13 | Prospect 14 |
|---|---|---|---|---|---|---|---|---|---|---|---|---|---|---|
| Prospect 1 | | 0.02 | 0.02 | 0 | 0.01 | 0 | 0 | 0.05 | 0.05 | 0 | 0.05 | 0 | 0 | 0 |
| Prospect 2 | | | 0.02 | 0 | 0.01 | 0 | 0 | 0.05 | 0.05 | 0 | 0.05 | 0 | 0 | 0 |
| Prospect 3 | | | | 0 | 0.01 | 0 | 0 | 0.05 | 0.05 | 0 | 0.05 | 0 | 0 | 0 |
| Prospect 4 | | | | | 0 | 0.02 | 0.02 | 0 | 0 | 0.02 | 0 | 0 | 0 | 0.01 |
| Prospect 5 | | | | | | 0 | 0 | 0.05 | 0.05 | 0 | 0.05 | 0 | 0 | 0 |
| Prospect 6 | | | | | | | 0.04 | 0 | 0 | 0.03 | 0 | 0 | 0 | 0.02 |
| Prospect 7 | | | | | | | | 0 | 0 | 0.03 | 0 | 0 | 0 | 0.02 |
| Prospect 8 | | | | | | | | | 0.02 | 0 | 0.02 | 0.01 | 0.01 | 0 |
| Prospect 9 | | | | | | | | | | 0 | 0.02 | 0.01 | 0.01 | 0 |
| Prospect 10 | | | | | | | | | | | 0 | 0 | 0 | 0.02 |
| Prospect 11 | | | | | | | | | | | | 0.01 | 0.01 | 0 |
| Prospect 12 | | | | | | | | | | | | | 0.02 | 0 |
| Prospect 13 | | | | | | | | | | | | | | 0 |
| Prospect 14 | | | | | | | | | | | | | | |

FIG. 5B

600

| Prospect/ Economic Synergy | Prospect 1 | Prospect 2 | Prospect 3 | Prospect 4 | Prospect 5 | Prospect 6 | Prospect 7 | Prospect 8 | Prospect 9 | Prospect 10 | Prospect 11 | Prospect 12 | Prospect 13 | Prospect 14 |
|---|---|---|---|---|---|---|---|---|---|---|---|---|---|---|
| Prospect 1 | | 0 | 0 | 0 | 0 | 0 | 0 | 0 | 0 | 0 | 0 | 0 | 0 | 0 |
| Prospect 2 | | | 0 | 0 | 0 | 0 | 0 | 0 | 0 | 0 | 0 | 0 | 0 | 0 |
| Prospect 3 | | | | 0 | 0 | 0 | 0 | 0 | 0 | 0 | 0 | 0 | 0 | 0 |
| Prospect 4 | | | | | 0 | 0 | 0 | 0 | 0 | 0 | 0 | 0 | 0 | 0 |
| Prospect 5 | | | | | | 0 | 0 | 0 | 0 | 0 | 0 | 0 | 0 | 0 |
| Prospect 6 | | | | | | | 0 | 0 | 0 | 0 | 0 | 0 | 0 | 0 |
| Prospect 7 | | | | | | | | 0 | 0 | 0 | 0 | 0 | 0 | 0 |
| Prospect 8 | | | | | | | | | 0 | 0 | 0 | 0 | 0 | 0 |
| Prospect 9 | | | | | | | | | | 0 | 0 | 0 | 0 | 0 |
| Prospect 10 | | | | | | | | | | | 0 | 0 | 0 | 0 |
| Prospect 11 | | | | | | | | | | | | 0 | 0 | 0 |
| Prospect 12 | | | | | | | | | | | | | 0.15 | 0.15 |
| Prospect 13 | | | | | | | | | | | | | | 0.15 |
| Prospect 14 | | | | | | | | | | | | | | |

FIG. 6

700

| Geographic Coordinates (km) | Prospect 1 | | Prospect 2 | | Prospect 3 | | Prospect 4 | | Prospect 5 | | Prospect 6 | | Prospect 7 | | Prospect 8 | | Prospect 9 | | Prospect 10 | | Prospect 11 | | Prospect 12 | | Prospect 13 | | Prospect 14 | |
|---|---|---|---|---|---|---|---|---|---|---|---|---|---|---|---|---|---|---|---|---|---|---|---|---|---|---|---|---|
| | X | Y | X | Y | X | Y | X | Y | X | Y | X | Y | X | Y | X | Y | X | Y | X | Y | X | Y | X | Y | X | Y | X | Y |
| | -10 | -10 | 0 | -10 | 50 | -10 | 250 | -10 | 300 | -9 | 600 | -10 | 650 | -5 | 700 | -10 | 800 | -15 | 850 | -10 | 870 | -20 | 1000 | -15 | 1100 | -10 | 1200 | -18 |

FIG. 7

OIL AND GAS EXPLORATION PORTFOLIO OPTIMIZATION WITH GEOLOGICAL, ECONOMICAL, AND OPERATIONAL DEPENDENCIES

CROSS-REFERENCE TO RELATED APPLICATIONS

This application is a continuation-in-part of U.S. patent application Ser. No. 17/512,135 entitled "Oil and Gas Exploration Portfolio Optimization with Geological, Economical, and Operational Dependencies" filed on Oct. 27, 2021, which is hereby incorporated by reference in its entirety.

TECHNICAL FIELD

The present disclosure relates to oil and gas exploration, and more particularly to the optimization of prospect portfolios for efficient oil and gas exploration.

BACKGROUND

Oil and gas exploration portfolios typically include a list of prospects that are ranked based on a standalone analysis, wherein each prospect is ranked independent of the other. Ranking a prospect typically involves selecting the prospect with the best risk to reward ratio. This is often a challenging task because it involves the integration of a wide variety and a significant volume of data as well as subjective determinations about each prospect.

The prospects of the portfolio are found and evaluated by exploration teams with the primary objective of defining the probability of success and resource distribution if a prospect were to be selected for drilling. Traditionally, they have been ranked and selected to be drilled based on their individual risk and economic values. However, some prospects are inherently related from geological and/or economic perspectives. This means that the outcome of a drilled prospect could affect the risk and/or economic value of other undrilled prospects remaining in the portfolio, and thus the dependencies between prospects need to be captured and quantified. Currently, the standard methodologies for portfolio analysis fail to include these relations in the prospect assessment process. Failure to capture these relations could result in misrepresentation of the true risk and reward of the portfolio, which thereby could result in lost opportunities and/or sub-optimal drilling sequences.

Furthermore, in oil and gas exploration, decisions are made early in the initial phases when risk and uncertainty are high. As prospects begin to become explored, more information may be gathered about a prospect, and thus other related prospects, that can shed more light on the risks and rewards of other prospects in the portfolio. Therefore, there is a need for an intelligent strategy for oil and gas exploration portfolio optimization that considers the dependencies between prospects as well as remains up-to-date when more information is gathered regarding prospects of the portfolio.

SUMMARY

In accordance with one embodiment of the present disclosure, a method includes generating, using prospect evaluation hardware, prospect inputs for a plurality of prospects, each prospect input having fixed inputs and dynamic inputs, storing the prospect inputs into a prospect model data memory, and generating, using a prospect simulator module, correlation matrices based on the dynamic inputs, wherein the correlation matrices include a distance matrix that correlates a distance relationship between each pair of prospects of the plurality of prospects with a correlation factor calculated based on a cost of moving rigs between each pair of prospects. The method further includes determining, using the prospect simulator module, a set of drilling sequences for the plurality of prospects based on a budget, modeling, by Monte Carlo simulation using the prospect simulator module, each drilling sequence of the set of drilling sequences within the prospect inputs, wherein each iteration of modeling is complete when exploration constraints are reached, and generating, using the prospect simulator module, an optimal drilling sequence, including a risk and a reward for the optimal drilling sequence. The method also includes translating, using a prospect simulator translation module, the optimal drilling sequence for use in drilling prospects by rig-up implementation hardware.

In accordance with another embodiment of the present disclosure, a system includes prospect evaluation hardware that generates prospect inputs for a plurality of prospects, each prospect input having fixed inputs and dynamic inputs, a prospect model data memory that receives and stores the prospect inputs, and a prospect simulator module. The prospect simulator module receives the prospect inputs from the prospect model data memory, generates correlation matrices based on the dynamic inputs, wherein the correlation matrices include a distance matrix that correlates a distance relationship between each pair of prospects of the plurality of prospects with a correlation factor calculated based on a cost of moving rigs between each pair of prospects, determines a set of drilling sequences for the plurality of prospects based on a budget, models, by Monte Carlo simulation, each drilling sequence of the set of drilling sequences within the prospect inputs, wherein each iteration of modeling is complete when the exploration constraints are reached, and generates an optimal drilling sequence, including a risk and a reward for the optimal drilling sequence. The system also includes a prospect simulator translation module that translates the optimal drilling sequence for use in drilling prospects by rig-up implementation hardware.

BRIEF DESCRIPTION OF THE DRAWINGS

The following detailed description of specific embodiments of the present disclosure can be best understood when read in conjunction with the following drawings, where like structure is indicated with like reference numerals and in which:

FIG. 4A depicts an example prospect database, according to one or more embodiments shown and described herein;

FIG. 5A depicts an example geological matrix for success cases, according to one or more embodiments shown and described herein;

FIG. 5B depicts an example geological matrix for failure cases, according to one or more embodiments shown and described herein;

FIG. 6 depicts an example economic matrix, according to one or more embodiments shown and described herein;

FIG. 7 depicts an example distance matrix, according to one or more embodiments shown and described herein;

DETAILED DESCRIPTION

The embodiments disclosed herein include methods and systems for optimizing oil and gas prospect portfolios with geological, economical, and operational dependencies. Integrating the geological, economic, and operational variables allows for a more robust analysis of a portfolio because these variables can affect the risk and/or reward of other prospects in the portfolio that have yet to be explored. To further consider the varying degree of factors in exploring a prospect, embodiments rank the prospects based on a Monte Carlo method that models all possible combinations of prospect variables. The primary result of embodiments is a risk to reward plot, which may be used to define an efficiency frontier. The efficiency frontier can act as a road map to guide oil and gas companies in selecting the optimal sequence of prospects to drill after every drilled prospect.

Figure 1:
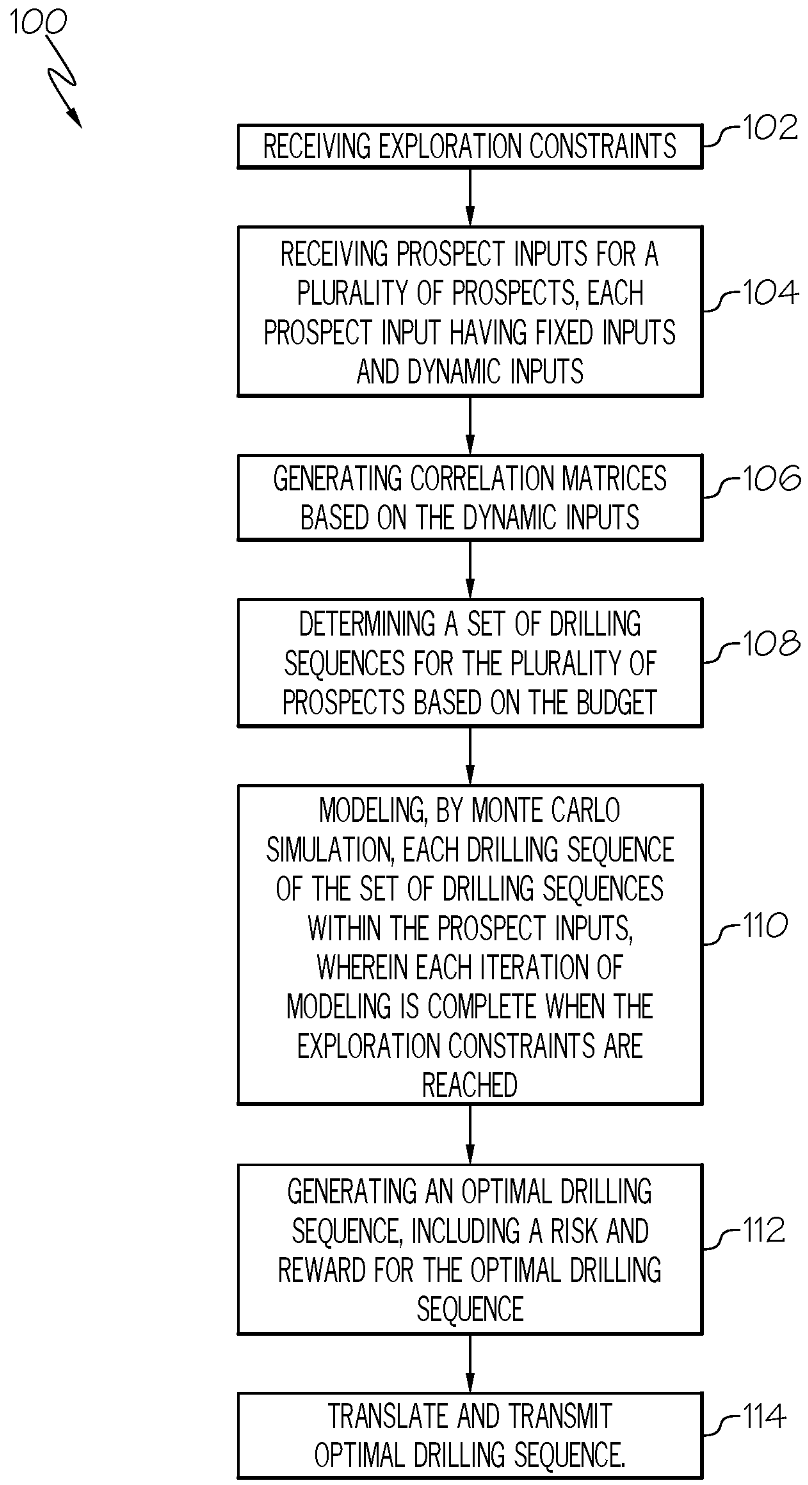
FIG. 1 depicts an example method for generating an optimal drilling sequence, according to one or more embodiments shown and described herein.
Figure 2:
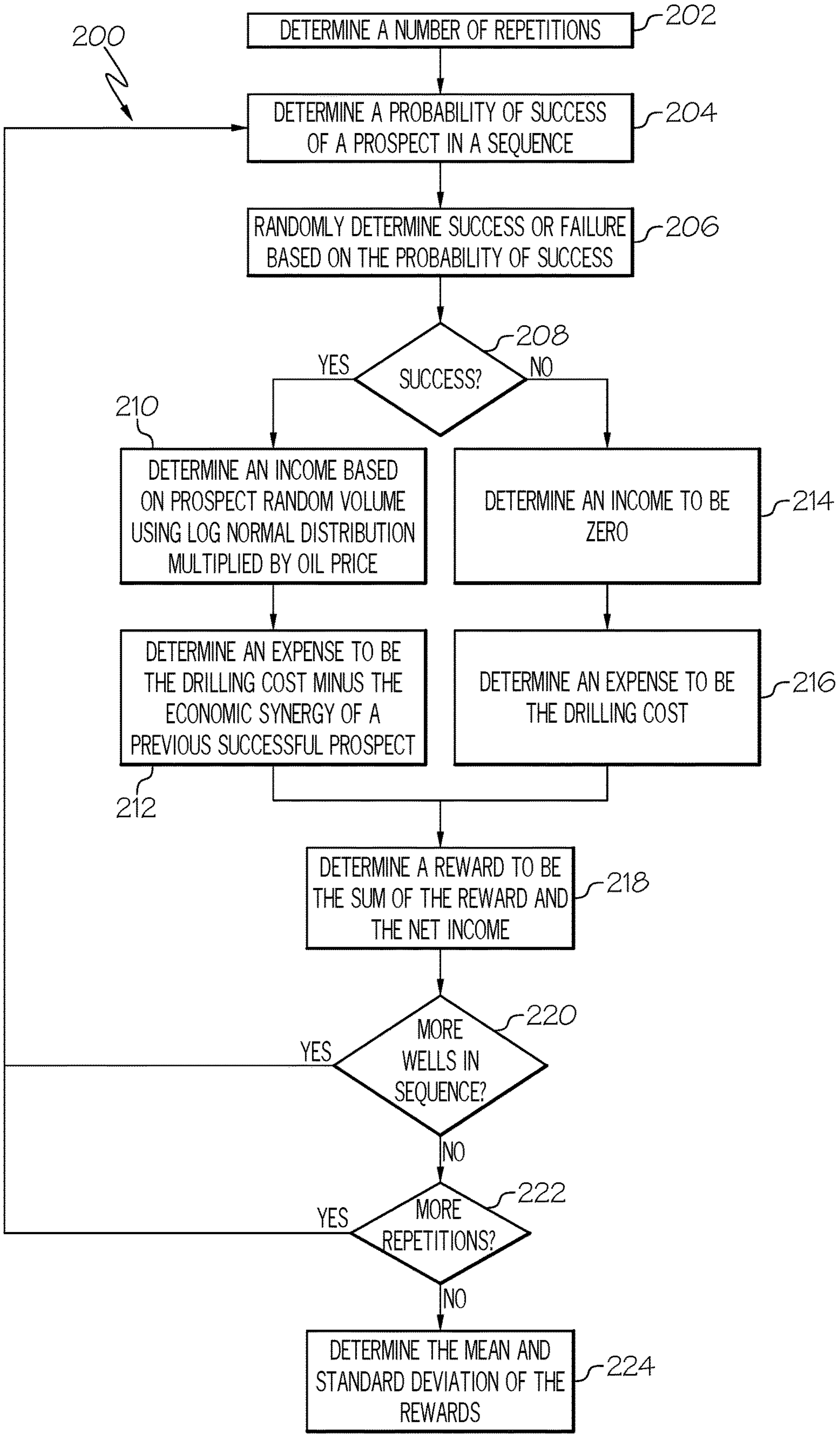
FIG. 2 depicts an example method for performing a Monte Carlo simulation, according to one or more embodiments shown and described herein.
Figure 3:
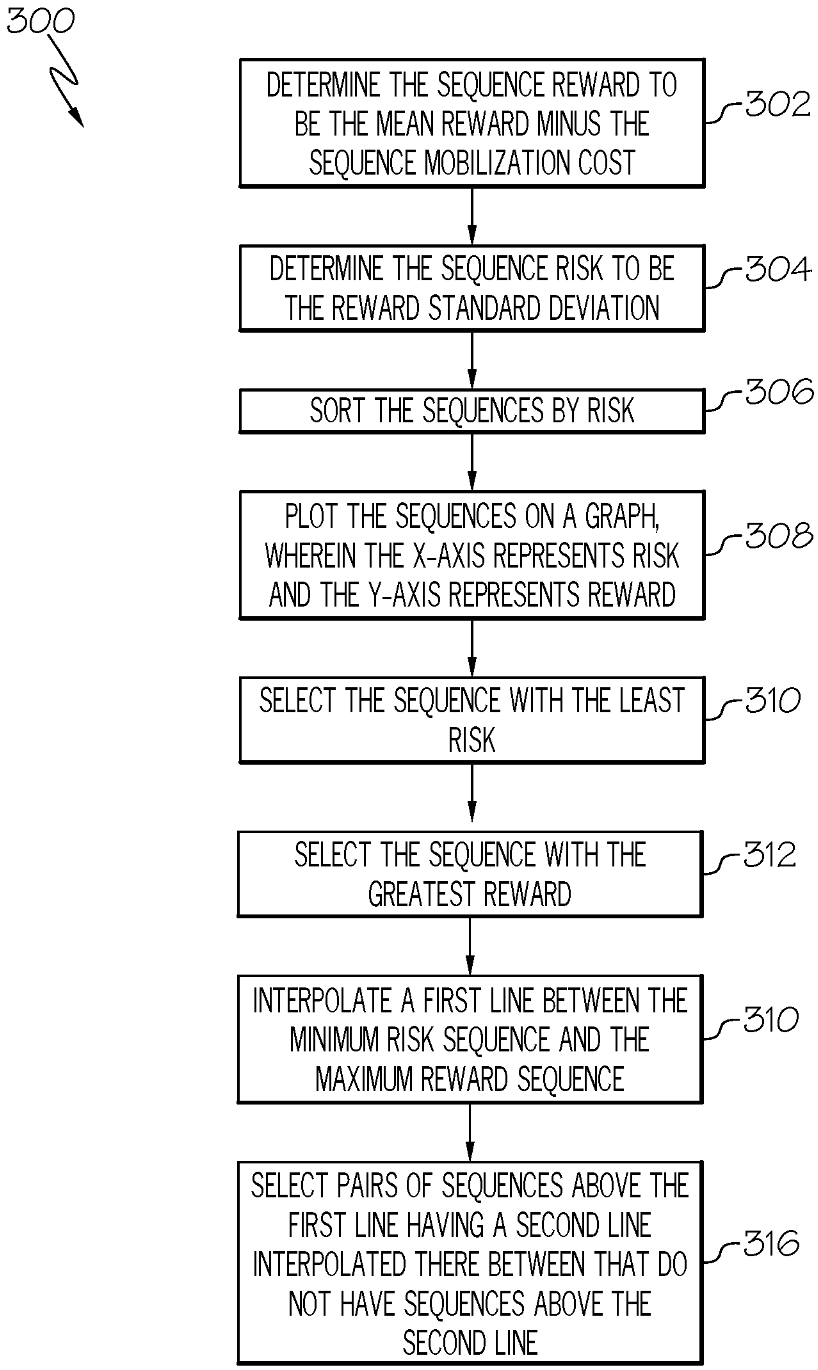
FIG. 3 depicts an example method for finding frontier sequences, according to one or more embodiments shown and described herein.
Figure 4B:
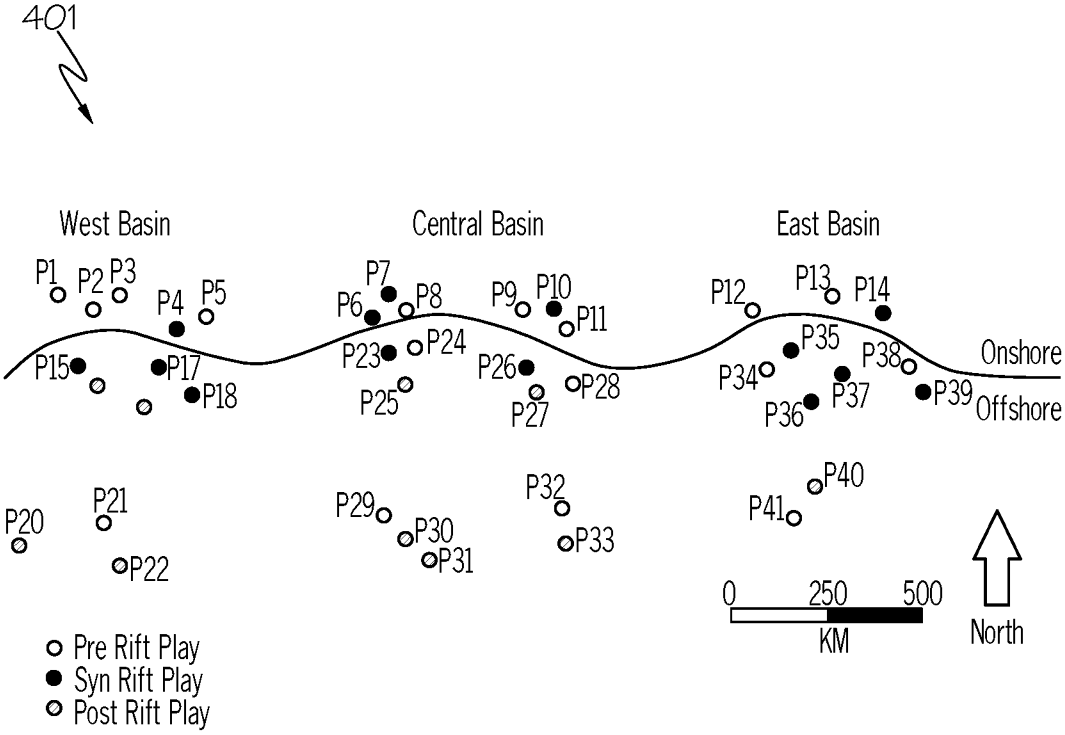
FIG. 4B depicts an example prospect map of the prospects from the example prospect database of FIG. 4A, according to one or more embodiments shown and described herein.
Figure 8A:
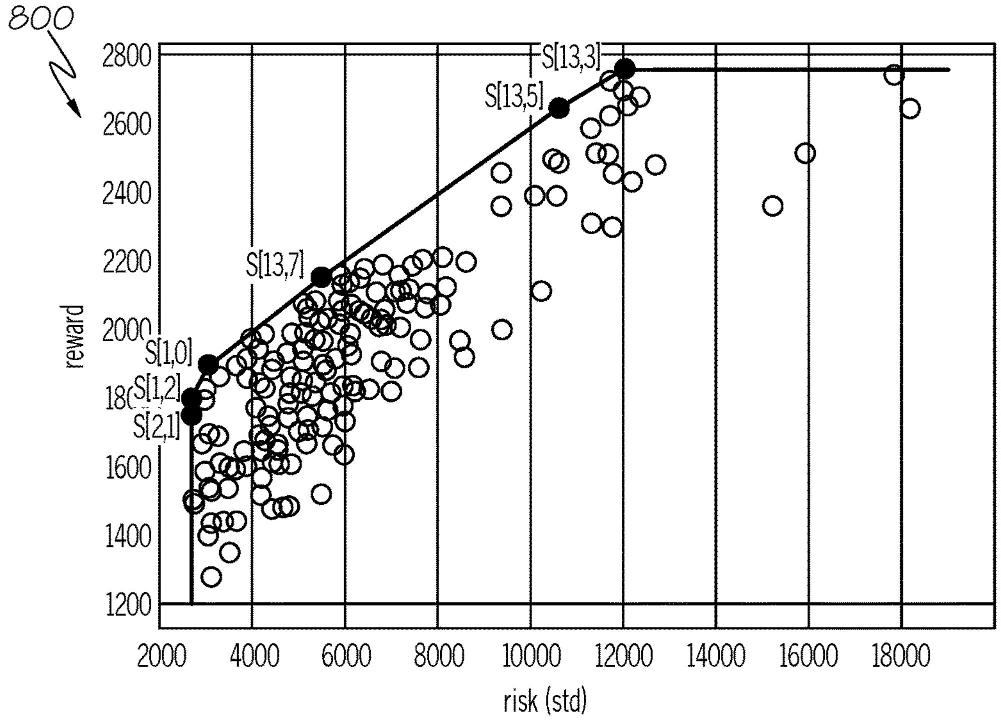
FIG. 8A depicts an example output plot for 14 prospects and sequences of 2 prospects, according to one or more embodiments shown and described herein.
Figure 8B:
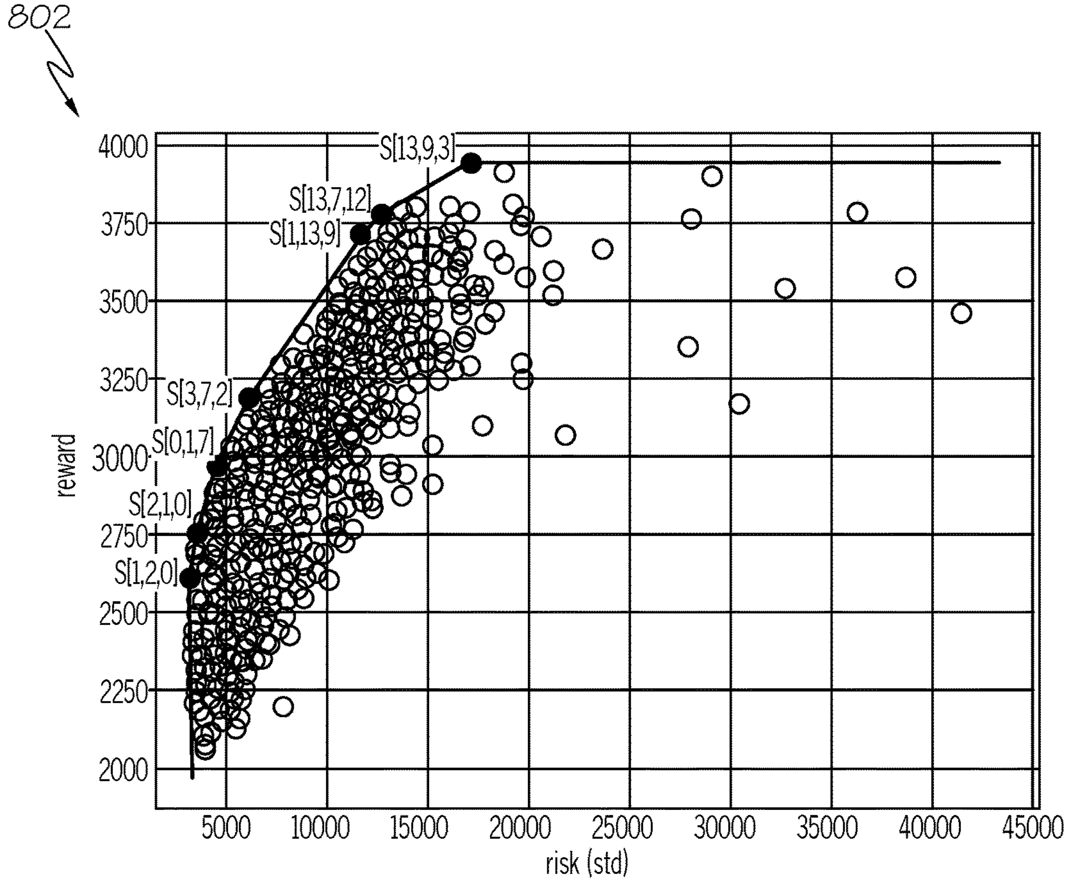
FIG. 8B depicts an example output plot for 14 prospects and sequences of 3 prospects, according to one or more embodiments shown and described herein.
Figure 9:
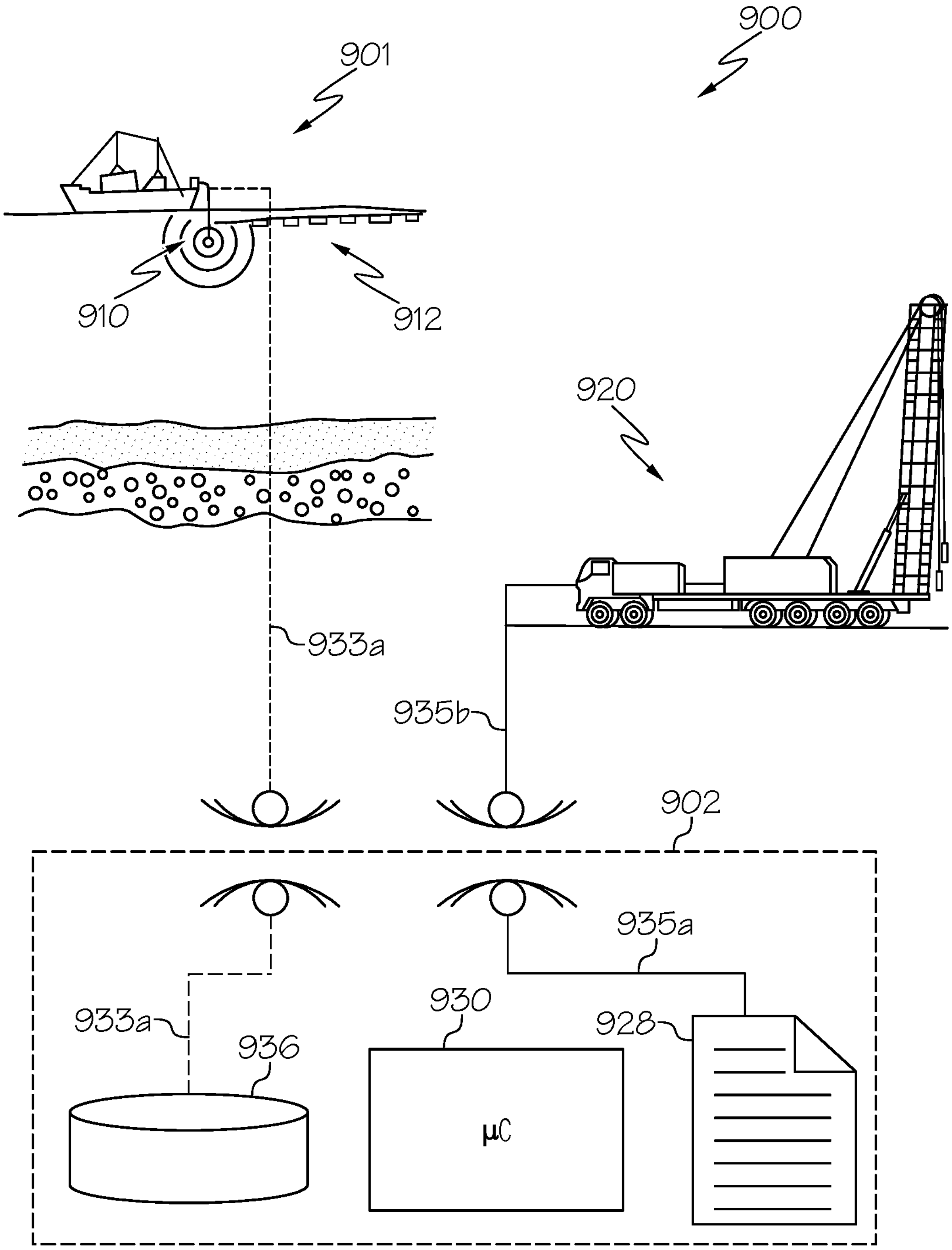
FIG. 9 depicts an example exploration and rig-up system according to one or more embodiments shown and described herein.

In embodiments disclosed herein, a system may generate a prospect database representing a portfolio and analyze the prospect database with methods as shown in FIGS. 1-3. The prospect database may contain fixed and dynamic inputs for each prospect in the portfolio, as shown in FIGS. 4A-4B. Throughout the present application, prospects may be referred to as numbered prospects, “Prospect1” or “P1”, “Prospect2” or “P2”, and so on. The prospect database may be used to generate correlation matrices, as shown in FIGS. 5A-7. The outputs from the analyses of FIGS. 1-3 are shown in the plots of FIGS. 8A-8B. An example computer system that may be used for carrying out the methods described herein is shown in FIG. 9.

Referring now to FIG. 1, an example method 100 for generating an optimal drilling sequence is depicted. At step 102, a system may receive exploration constraints. The exploration constraints are used as sensitivities to identify the most efficient drilling sequence. The exploration constraints are customizable to be used for sensitivity analysis. Exploration constraints may include a budget (i.e., the funds available for an exploration campaign), a duration (i.e., the amount of time available for the exploration campaign), a number of rigs (i.e., equipment used for drilling such as offshore and onshore rigs), and any other constraint to the overall exploration campaign. The exploration constraints may be manually determined by a user of the system and/or automatically determined by computer systems that monitor the constraint. For example, a user may manually enter a budget, or a database that monitors funds earmarked for a particular exploration campaign may automatically enter the budget based on the funds it monitors.

At step 104, the system may receive prospect inputs for a plurality of prospects. Each prospect input may have fixed inputs and dynamic inputs. Fixed inputs for each prospect may include a name, a play type, a location, a drilling costs, a size distribution, an expected fluid, and any other prospect information that will not change during the method 100. A “name” is an arbitrary name used to identify a prospect, such as “Prospect1” or “P1”. A “play” is a group of prospects in the same region that are influenced by the same set of geological circumstances, and thus a “play type” may include exploration drilling target locations such as pre-rift, syn-rift, and post-rift of a basin. A “location” may be an indication of whether the prospect is located onshore or offshore. A “drilling cost” is a cost of drilling that could be different for each prospect, which may also include a cost per kilometer for mobilizing equipment to perform the drilling. A “size distribution” is the prospect’s volume measured in millions of barrels of oil equivalent (MMBOE) and may include a range from a low estimate to a high estimate. An “expected fluid” is the fluid the prospect is expected to contain, such as oil or gas. Dynamic inputs for each prospect may include a probability of success, a net present value, and any other inputs that could change once new information arrives at the system upon subsequent drilling. A “probability of success” is a probability that the prospect will not be dry. A “net present value” is an estimated monetary value of a prospect.

At step 106, the system may generate correlation matrices based on the dynamic inputs. The correlation matrices link the dynamic inputs (e.g., probability of success and net present value). The purpose of the correlation matrices is to account for the variations in the dynamic inputs when calculating the reward (e.g., expected monetary value) for each drilling sequence scenario. The method may utilize three matrices: a geological matrix, an economic matrix, and a distance matrix.

At step 108, the system may determine a set of drilling sequences for the plurality of prospects based on the budget. The system may generate an initial set of drilling sequences by enumerating permutations of the plurality of prospects. The number of permutations of prospects is $P(n, m)=m!/(m-n)!$, where m is the number of prospects and n is the maximum number of prospects per sequence. For example, if there are 3 prospects (e.g., A, B, and C) and sequences may have 2 prospects, then there are 6 possible sequences: [A, B], [A, C], [B, A], [B, C], [C, A], and [C, B].

To account for the budget, each sequence in the initial sequence list may be reduced so that each sequence is at or below the budget. For each sequence in the initial set of drilling sequences, an expense is determined based on a distance between a first prospect and a second prospect multiplied by a mobilization cost. Then, for each current prospect (e.g., the first prospect) and subsequent prospect (e.g., the second prospect) in a sequence until the expense is greater than the budget, the expense is updated to be the sum of the expense, the drilling cost, and the distance between the current and subsequent prospect multiplied by the mobilization cost. If the updated expense is not greater than the budget, then the current prospect is kept in the sequence.

For example, consider the 6 sequences from the previous example: [A, B], [A, C], [B, A], [B, C], [C, A], and [C, B]. To reduce the first sequence (i.e., [A, B]) to meet the example budget (i.e., $1,000,000), the expense is first set to the distance to the first prospect (i.e., A) multiplied by the example mobilization cost (i.e., $1,000/kilometer). Assuming the distance to prospect A is 500 kilometers, then the expense is set to $500,000 (i.e., 500*1,000). Because prospect A has been drilled at a drilling cost of $50,000, prospect A becomes the current prospect and prospect B becomes the subsequent prospect. Assuming the distance between prospect A and B is 400 kilometers, the expense is updated to be $950,000 (i.e., 500,000+50,000+(400*1,000)). Because the updated expense is less than the budget, prospect B would remain in the sequence. Assuming there are prospects C and D in the sequence, the process would continue with prospect B now as the current prospect and prospect C as the subsequent prospect and would iterate until each prospect has been calculated or the budget has been reached.

However, assuming the distance between prospect A and B is 600 kilometers, the expense is updated to be $1,150,000 (i.e., 500,000+50,000+(600*1,000)). Because the updated expense is greater than the budget, prospect B would not be included in the sequence and the process would end at prospect B if there were any more prospects in the sequence.

A method to reduce a sequence to meet the budget may be embodied by the following pseudocode:

At step 114, the optimal drilling sequence is translated into instructions capable of being interpreted and acted on by rig-up implementation hardware 920, such as a rig-up truck as shown in FIG. 9. Further at step 114, the translated optimal drilling sequence may be transmitted to any rig-up implementation hardware 920 to control one or more hardware components of the rig-up implementation hardware 920 automatically and without human intervention, such as autonomous control of a rig-up truck or crane to orient a rig at a precise location according to the optimal drilling sequence.

Referring now to FIG. 2, an example method 200 for performing a Monte Carlo simulation is depicted. The Monte Carlo simulations add a probabilistic approach to the optimization of a prospect portfolio. That is, the optimization may utilize randomness to account for degrees of risk that may be inherent between pairs of prospects. In step 202,

```
Reduce sequence to meet budget:
  set reduced_sequence := empty list
  set expenses := distance(rig location, first prospect)
  * mobilization_cost
  for each previous and current prospect in sequence:
    set a := previous prospect
    set b := current prospect
    set expenses := expenses + drill_cost + distance(a,b * mobilization_cost
    if expenses is greater than budget:
      break
    else:
      add current prospect to reduced_sequence
  return reduced_sequence
```

At step 110, the system may model each drilling sequence of the set of drilling sequences within the prospect inputs. The modeling may be done by Monte Carlo simulation and may be performed until the exploration constraints are reached. The operations performed in step 110 will be discussed in more detail with respect to FIG. 2. In short, for each sequence, the system determines a number of repetitions. The system may compute a probabilistic reward of the sequence for each repetition in the number of repetitions. Then, the system may determine and output a mean and a standard deviation of the probabilistic rewards for each sequence.

At step 112, the system may generate an optimal drilling sequence, including a risk and reward for the optimal drilling sequence. The system may also generate a standard deviation, resource distribution, number of prospects drilled for each possible sequence, total cost of the campaign, and/or probability of economic success. The steps performed in step 112 will be discussed in more detail with respect to FIG. 3. In short, the system may sort the set of drilling sequences by risk and plot the set of drilling sequences on a graph, wherein the x-axis of the graph represents risk and the y-axis of the graph represents reward. The system then selects a minimum risk drilling sequence and a maximum reward drilling sequence from the set of drilling sequences. The system may interpolate a first line between the minimum risk drilling sequence and the maximum reward drilling sequence on the graph. Lastly, the system may then iteratively select pairs of drilling sequences that are above the first line having a second line interpolated therebetween that do not have drilling sequences above the second line. In some embodiments, the system may be integrated into one or more computers of one or more rigs and directs the drilling of prospects according to the optimal drilling sequence.

the system determines a number of repetitions. The number of repetitions may be an arbitrary number, such as 10,000, and may be predetermined. Steps 204-222 may be performed for the number of repetitions determined in step 202. A higher number of repetitions may lead to a more accurate result, but it may also require more time to compute. On the other hand, a lower number of repetitions may be easier to compute, but it may lead to a less accurate result.

In step 204, the system may determine a probability of success of prospects in a sequence for the current iteration. The prospects may be evaluated in order of the sequence. Probability of success may be a factor of a prospect's geological relationship with a previously drilled prospect. Accounting for previously drilled prospects captures any inherent relationships that may exist between prospects, which may result in more accurate optimizations. To account for previously drilled prospects and geological relationships between prospects, the system may reference the geological matrix generated in step 106.

For example, in the sequence of independent prospects [A, B], where the probability of success of prospect A is 39% and prospect B is 44%, the following possibilities may be computed (note that A represents the success of prospect A, whereas !A represents the failure of prospect A):

Where P(A)=0.39, P(!A)=0.61, P(B)=0.44, and P(!B)=0.56

$$[A,B]=P(A)*P(B)=0.39*0.44=0.1716$$

$$[A,!B]=P(A)*P(!B)=0.39*0.56=0.2184$$

$$[!A,B]=P(!A)*P(B)=0.61*0.44=0.2684$$

$$[!A,!B]=P(!A)*P(!B)=0.61*0.56=0.3416$$

Success and failure correlations are located in the geological matrix and may be used to account for geological dependency between prospects. For the case of geological dependency of prospects [A, B] with a success correlation of 0.04 and failure correlation of 0.02, prospect B will increase or decrease the probability in case of prospect A success or failure, respectively. For example, the following possibilities may be computed:

$$P(A)=0.39$$

$$P(!A)=0.61$$

$$P(B/A)=0.44+0.04=0.48, P(B/!A)=0.44-0.02=0.42$$

$$P(!B/A)=1-0.48=0.52, P(!B/!A)=1-0.42=0.58$$

$$[A,B]=P(A)*P(B/A)=0.39*0.48=0.1872$$

$$[A,!B]=P(A)*P(!B/A)=0.39*0.52=0.2028$$

$$[!A,B]=P(!A)*P(B/!A)=0.61*0.42=0.2562$$

$$[!A,!B]=P(!A)*P(!B/!A)=0.61*0.58=0.3538$$

In step 206, the system may randomly determine the success or failure of the prospect for the current iteration. The randomness is based on the probability determined in step 204. The system may utilize any method for determining a random outcome of success or failure. For example, the system may use a random or pseudo-random number generator to generate a number and take the remainder of the number divided by 2 (i.e., random number mod 2), after which the system may use 1 to represent the success of a prospect and 0 to represent the failure of a prospect.

In step 208, the system evaluates whether the random outcome of step 206 is a success or a failure. If the prospect is a success, then the process performs step 210 and step 212.

In step 210, the system determines an income from the drilling of the prospect for the current iteration. The income is the price of oil (or gas, depending on the product of the prospect) multiplied by the random volume of the prospect. The random volume may be within the potential range of volumes of the prospect. Particularly, the random volume may be within the log-normal distribution of volumes of the prospect. For example, for prospect volume [10th percentile, 50th percentile, 90th percentile] of [90, 25, 7] MMBOE, respectively, mu and sigma of a log-normal distribution may be determined by the following pseudocode:

```
set ppf := percent point function of normal distribution with mu=0,
sigma=1
set denominator := ppf(0.9) - ppf(0.1)
set sigma := (ln(90) - ln(7)) / denominator
set mu := e^?((ln(7) * ppf(0.9) - ln(90) * ppf(0.1)) / denominator)
use mu and sigma for the volume log normal distribution
```

In step 212, the system may determine an expense from the drilling of the prospect for the current iteration. The expense may be the drilling cost less the economic synergy of a previous successful prospect. To determine the economic synergy, the economic correlation matrix may be utilized. Economic synergy may be representative of the cost savings from, for example, the reuse of existing infrastructure or the sharing of infrastructure between prospects.

Returning to step 208, the system evaluates whether the random outcome of step 206 is a success or a failure. If the prospect is not a success (i.e., a failure), then the process performs step 214 and step 216.

In step 214, the income from the prospect of the current iteration is zero because it was a failure (i.e., it was dry).

In step 216, the expense from the prospect of the current iteration is the cost of drilling the prospect.

In step 218, the system determines a reward. The reward may be the sum of the reward for the current sequence at the current iteration and the net income (i.e., income less expenses). The reward for the current sequence may be updated at each iteration to account for the net income of each prospect in the sequence.

In step 220, the system determines whether there are more prospects in the sequence. If there are more prospects in the sequence, the system may repeat steps 204-218 utilizing the next prospect in the sequence as the prospect of the current iteration. If there are no more prospects in the sequence, the system may proceed to step 222.

In step 222, the system determines if there are more repetitions in the Monte Carlo simulation. Because computing the probabilistic reward of a sequence involves random variables, the system repeats the computation numerous times (i.e., the number of repetitions of step 202) utilizing new, random variables each repetition. If there are more prospects in the sequence, the system may repeat steps 204-218 starting from the first prospect in the sequence as the prospect of the current iteration and iteratively proceeding through each prospect. If there are no more repetitions for the sequence, the system may proceed to step 224.

In step 224, the system determines the mean and standard deviation of the rewards. The rewards may be the reward calculated at each repetition. The reward of a sequence may be represented by the mean of the rewards less the sequence mobilization cost. The risk of a sequence may be the reward distribution standard deviation.

The method 200 may be embodied by the following pseudocode:

```
Monte Carlo:
  set N := number_of_repetitions
  set reward_list := empty list
  repeat N times:
    set reward := compute probabilistic reward of sequence
    add reward to reward_list
  return mean and standard deviation of reward_list
Compute probabilistic reward of sequence:
  set reward := 0
  for each prospect in sequence:
    set p := probability of success of prospect using correlation matrix with drilled
    prospects
    set success := prospect random choice of success or failure [1,0] using p and 1-p,
    respectively
```

-continued

```
    if success = 1:
        set income := prospect random volume using log normal distribution *
        oil_price
        set expenses := drill_cost + economic synergy from economic correlation
         matrix
    else:
        set income := 0
        set expenses := drill_cost
    set reward := reward + income - expenses
return reward
```

Referring now to FIG. 3, an example method 300 for finding frontier sequences is depicted. Frontier sequences are one or more drilling sequences that contain the most efficient permutations of prospects. Based on the frontier sequences, a user can decide which sequences are the most relevant for the decision-making process. Methods disclosed herein narrow down the field of possible drilling sequences, leaving only the most efficient for the user to select from based on its criteria, such as risk and uncertainty tolerance, budget allocation strategy, and the like. In addition, the analysis of the frontier sequences can assist companies in determining exploration strategies beyond the drilling campaign. For example, they can identify the more attractive plays or areas that are underrepresented in the prospect portfolio and guide the user on where to allocate the resources (e.g., where the exploration team should focus its exploration research).

At step 302, the system determines the sequence reward. For each sequence, the sequence is reduced to meet a budget or any other predetermined constraint, a Monte Carlo simulation is run on the sequence, as described in method 200. Based on the outcome of the Monte Carlo simulation, the sequence reward for each sequence may be calculated. The sequence reward may be equal to the mean of the rewards output from the Monte Carlo simulation of the sequence less the sequence mobilization cost (e.g., the cost per kilometer of moving the drilling equipment to each prospect of the sequence).

At step 304, the system determines the sequence risk. For each sequence, the sequence is reduced to meet a budget or any other predetermined constraint, a Monte Carlo simulation is run on the sequence, as described in method 200. Based on the outcome of the Monte Carlo simulation, the sequence risk for each sequence may be calculated. The sequence risk may be equal to the standard deviation of the distribution of rewards output from the Monte Carlo simulation of the sequence.

At step 306, the system sorts the sequences by risk. Embodiments are not limited to any particular sorting algorithm.

At step 308, the system plots the sequences on a graph. The sequences may be plotted based on their level of reward and risk, where reward may be the mean of the rewards less the sequence mobilization cost and the risk may be the reward distribution standard deviation as calculated in step 224. The x-axis of a graph may represent risk and the y-axis of a graph may represent reward, and the sequences may be plotted accordingly. In some embodiments, sequences may be plotted as their risks and reward are being calculated during method 200. In some embodiments, the output of the system may not include graphs for the user, in which case step 308 may be omitted. It should be understood that plotting the sequences on the graph is not limited to graphs of 2 dimensions. For example, sequences may contain a third feature in addition to reward and risk (e.g., level of dependence) that may be a factor in selecting an optimal drilling sequence.

At step 310, the system selects the sequence with the minimum risk. For example, the sequence with the least risk may be the first sequence in the list of sequences ordered by risk.

At step 312, the system selects the sequence with the maximum reward. For example, the system may iterate through the sequences ordered by risk to determine the sequences with the most reward. The sequence with the most reward may typically be the sequence with the most risk.

At step 314, the system interpolates a first line between the minimum risk sequence from step 310 and the maximum reward sequence from step 312. The system may perform a linear interpolation to generate a line that runs through the plotted minimum risk sequence and the plotted maximum reward sequence. For example, the system may determine a slope and a y-intercept to represent a line from the minimum risk sequence and the maximum risk sequence. The line may be plotted on the graph for output to the user to show the user the running process of determining an optimal frontier.

At step 316, the system selects pairs of sequences above the first line having a second line interpolated therebetween that do not have sequences above the second line. In other words, for each pair of sequences above the first line, the system interpolates a second line and determines whether there are sequences above the second line. If there are no sequences above the second line, then the pair of sequences are added to the frontier, the first line is set equal to the second line, and the system repeats this step with the next pair of sequences. The process is repeated until there are no more sequences above the first line.

For example, consider an ordered sequence list S0, S1, S2, and S3, wherein S0 has the least risk and S3 has the greatest reward. The system may first interpolate a first line that runs through S0 and S3. A list of outsider sequences consisting of sequences above the line may then be generated. S0, being the sequence with the least risk is added to the frontier and is set as the previous sequence. The list of outsider sequences is then iterated through in pairs of previous and current sequences for each sequence in the list of outsiders until there are no more outsider sequences in the list. The first iteration would thus focus on S0 as the previous sequence and S1 as the current sequence. The system would interpolate a second line that runs through the previous sequence and the current sequence (e.g., S0 and S1, respectively). If there are no sequences above the second line, then the current sequence is added to the frontier, a new second line interpolated between the previous sequence and the current sequence, the current sequence is set to be the previous sequence, and the list of outsiders is replaced with the list of sequences above the new second line; otherwise, if there are sequences above the second line, the system continues to iterate through the list of outsiders, where the next sequence in the list of outsiders is the current sequence. Once the list of outsiders is empty, the sequence with the maximum reward is added to the frontier, and generating the frontier (i.e., a list) of optimal drilling sequences is complete. In some embodiments, a line indicating the optimal frontier may be plotted with the sequences. The line representing the optimal frontier may be an interpolation of a curve passing through the sequences with the greatest rewards wherein as x increases, y also increases.

The method 300 may be represented in the following pseudocode:

```
Find frontier in sequences_list:
  set frontier := empty list
  set min_risk_seq := minimum risk sequence in sequence_list
  set max_reward_seq := maximum reward sequence in sequence_list
  set m, b := slope and intercept of line from min_risk_seq to max_reward_seq
  set outsiders := list of sequences above line with parameters m, b
  set s0 := min_risk
  add min_risk_seq to frontier
  while outsiders is not empty:
    for each sequence s1 in outsiders:
      set m, b := slope and intercept of line crossing s0 and s1
      set outsiders := list of sequences above line with parameters m, b
      if outsiders is empty:
        add s1 to frontier
        set m, b := slope and intercept of line crossing s0 and s1
        set s0 := s1
        set outsiders := list of sequences above line
        with parameters m, b
        break
  add max_reward_seq to frontier
  return frontier
```

Referring now to FIG. 4A, an example prospect database 400 is depicted. The prospect database 400 contains the information regarding each prospect in a prospect portfolio, including fixed inputs and dynamic inputs. Fixed inputs for each prospect include a name 404, a play type 402, a basin 417, a location 418, and any other inputs that will not change during the optimization.

Dynamic inputs for each prospect include a probability of success 414 and a net present value. The probability of success 414 may be the product of the status of each petroleum system element including reservoir 406, seal 408, trap 410, and charge 412. The status of each petroleum system element may be determined by an exploration team of an oil and gas company, for example, who assigns a value between 0.1 and 1 for each element based on sensor data from prospect evaluation hardware 901, such as, without limitation, a seismic source 910 (e.g., a depth charge, dynamite, a thumper truck) and a seismic detector 912 (e.g., a geophone, a hydrophone), as shown in FIG. 9. The values are based on this sensor data, and provide a likelihood that such an element exists within the surveyed area. For example, for each element (e.g., reservoir 406, seal 408, trap 410, and charge 412), a value of 0.1 to 0.3 may represent a status of not present and ineffective, a value of 0.3 to 0.8 may represent a status of present and ambiguous, and a value of 0.8 and above may represent a status of present and effective. The net present value may be the product of a size distribution 416 (e.g., low, mid, and high in MMBOE in place) and the sales price for an expected fluid 420. For example, if the expected fluid 420 of prospect14 is oil and the price of oil per barrel is approximately $80, then the net present value of prospect14 ranges from $720,000,000 (i.e., 9 MMBOE*$80) to $32,000,000,000 (i.e., 400 MMBOE*$80).

For example, referring now to FIG. 4B, an example prospect map 401 of the prospects in the example prospect database 400 is depicted. The prospect database 400 is built in an extensional basin (rifted basin), with 3 sub-basins defined as the west, central, and cast basin, each of which having onshore and offshore areas. Based on the location, there are three potential plays: pre-rift, syn-rift, and post-rift. In this example, the pre-rift play is mature in the west and central basin in the onshore area and less explored in the east basin and offshore, in general. In addition, the syn-rift play is only partially explored, so it is less mature than the pre-rift play. Furthermore, the post-rift play is yet to be proven and is only present offshore. The foregoing characteristics of each play are captured in the prospect database 400 in the probability of success 414 because prospects tend to be less risky but also have smaller volumes as the play matures. This data may be utilized in generating the correlation matrices between the prospects. The onshore prospects of the prospect map 401 (i.e., prospect1 through prospect14, also referred to as P1 through P14) correlate to the prospects described in prospect database 400 and will be used as examples in the discussions of FIGS. 5A-8.

Referring now to FIG. 5A, an example geological matrix 500 for success cases is depicted. The geological matrix 500 correlates a geological relationship between each pair of prospects of the plurality of prospects with a correlation factor calculated based on the geological dependency of each pair of prospects, if any. The correlation factor is calculated based on how similar one prospect is to another from a petroleum geology perspective, and may be manually determined by an exploration team during the prospect portfolio building phase. The objective of the correlation factor is to modify the risk based on new information, such as the results of drilled prospects. The correlation factor between pairs of prospects rages between 0 to 1, where 0 indicates that the prospects are totally independent and 1 indicates that the prospects are totally dependent.

Prospects of the same play may have a higher correlation factor than prospects of different plays. For example, P1 (i.e., prospect1) is a pre-rift play that has a correlation factor of 0.04 with pre-rift plays P2 and P3, and P4 is a syn-rift play that has a correlation factor of 0.04 with syn-rift plays P6 and P7. However, P1 has a correlation factor of 0 with P6 and P7 because they are different plays, and P0 has a correlation factor of 0 with P2 and P3 because they are different plays. Additionally, prospects of the same basin may have a higher correlation factor than prospects of different basins. For example, P1 is a pre-rift play in the west basin that has a correlation factor of 0.04 with P3 in the west basin, 0.01 with P9 in the central basin, and 0 with P12 in the cast basin. Similarly, P4 is a syn-rift play in the west basin that has a correlation factor of 0.06 with P6 in the central basin, and 0.04 with P14 in the cast basin.

Referring now to FIG. 5B, an example geological matrix 502 for failure cases is depicted. The geological matrix may be divided into two sub-matrices, one for a success case and another for failure. The reason for maintaining separate geological matrices for success and failure cases is that the prospect information should be weighted differently if it is a failure. For example, in success (i.e., a discovery) scenarios, all the petroleum system elements have worked (i.e., reservoir 406, seal 408, trap 410, and charge 412), whereas, in failure scenarios, only one element may fail for the prospect to be a failure (i.e., dry). The disparity in requirements for success and failure cases creates an asymmetry in the information value that affects potential risk and reward calculations, and thus they are taken into account in geological matrices 500, 502 to deliver more accurate portfolio optimizations. Accordingly, to account for the lower value of correlations in failure scenarios, the correlation factors from the geological matrix 500 for success cases may be halved for the geological matrix 502 for failure cases.

Referring now to FIG. 6, an example economic matrix 600 is depicted. The economic matrix 600 correlates a cost relationship between each pair of prospects of the plurality of prospects with a correlation factor calculated based on the available infrastructure of each pair of prospects. The economic evaluation of a prospect may be based on factors including the currently available infrastructure of the region in which the prospect is located. A lack of existing infrastructure, such as in an isolated geographical area, may mean that developing a prospect will command a higher cost (i.e., capital expenditure or CAPEX). However, if a cluster of successful prospects is found in the same area, then the required CAPEX will be lower because some of the infrastructure used to explore prospects will have already been built or can be shared between prospects. Failure to capture this economic synergy could misrepresent the calculated risk and/or reward of some prospects. For example, although P13 and P14 are different plays, they are both located onshore in the cast basin and are expected to be oil-producing. Because of these similarities, infrastructure may be shared between P13 and P14, thereby reducing the potential CAPEX for exploring P13 and P14.

Referring now to FIG. 7, an example distance matrix 700 is depicted. The distance matrix 700 correlates a distance relationship between each pair of prospects of the plurality of prospects with a correlation factor calculated based on a cost of moving rigs between each pair of prospects. The methods described herein may use a coordinate system to measure the distance between prospects. From an operational perspective, accounting for the costs (e.g., in terms of money and time) of moving rigs may lead to a more accurate determination of efficient drilling sequences. It should be understood that methods of the present disclosure are not limited to a 2-dimensional coordinate system but may utilize other location identification systems such as geographic coordinate systems that provide location based on latitude, longitude, and/or elevation.

Referring now to FIG. 8A, an example output plot 800 for 14 prospects and sequences of 2 prospects is depicted. The 14 prospects represent prospect1 through prospect14 (i.e., P1 through P14) as shown in FIGS. 4A-7. The sequence notation is shown as S[A, B, . . . , N], wherein A is the first prospect, B is the second prospect, and N is the $n^{th}$ prospect out of n prospects. The sequences are generated in step 112, described in more detail in method 200. Output plot 800 depicts an example of a simulation with 14 prospects taking sequences of 2 prospects each. The result in bold shows the efficient sequences defining the frontier: S[2, 1], S[1, 2], S[1, 0], S[3, 7], S[13, 5], and S[13, 3]. All the other points (i.e., sequences) are inefficient sequences.

Referring now to FIG. 8B, an example output plot 802 for 14 prospects and sequences of 3 prospects is depicted. The 14 prospects represent prospect1 through prospect14 (i.e., P1 through P14) as shown in FIGS. 4A-7. The sequence notation is shown as S[A, B, . . . , N], wherein A is the first prospect, B is the second prospect, and N is the $n^{th}$ prospect out of n prospects. The sequences are generated in step 112, described in more detail in method 200. Output plot 800 depicts an example of a simulation with 14 prospects taking sequences of a maximum of 3 prospects each (maximum because sequences can be reduced to meet a constraint). The result in bold shows the efficient sequences defining the efficient frontier: S[1, 2, 0], S[2, 1, 0], S[0, 1, 7], S[3, 7, 2], S[1, 13, 9], S[13, 7, 12], and S[13, 9, 3]. All the other points (i.e., sequences) are inefficient sequences. It should be noted that this simulation is run under specific constraints (e.g., budget limitation and duration of the campaign), and changing the constraints could affect the outcomes. The interpretation of the output plot 802 is that P13 is likely the best to start from if the oil and gas company has a high tolerance for risk. On the other hand, P1 is likely the best to start from if the oil and gas company is risk-averse.

Referring now to FIG. 9, an example exploration and rig-up system 900 incorporating functionalities of the present disclosure is schematically illustrated. Generally, elements of one or more oil or gas prospects are determined by prospect evaluation hardware 901. The prospect evaluation hardware 901 generates data regarding elements of the various prospects, such as reservoirs, seals, traps and the like. This data is then processed by a prospect simulator model computing system 902 to generate an optimal drilling schedule based on the elements for the one or more oil or gas prospects. The optimal drilling schedule is then transmitted to rig-up implementation hardware 920 as instructions to perform operations based on the optimal drilling schedule. In some embodiments, the optimal drilling schedule is sent as computer-readable instructions such that one or more components of the rig-up implementation hardware 920 automatically performs functions to set up one or more rigs without human intervention. The rig-up implementation hardware 920 may include any components for setting up a drilling rig, such as, without limitation, rig-up trucks (e.g., as illustrated by FIG. 9), boats, lifts, cranes, and forklifts.

More specifically, the prospect evaluation hardware 901 gathers data regarding sub-subterranean elements within a prospect area. The prospect evaluation hardware 901 may include seismic exploration equipment, for example, such as, without limitation, a seismic source 910 (e.g., a depth charge, explosives, a thumper truck, an air gun, a boomer device, and the like) that generates seismic waves and a seismic detector 912 (e.g., a geophone, a hydrophone, and the like) that receives and generates data regarding detected seismic waves. This data are indicative of geological elements of the prospect area. It should be understood that embodiments are not limited by the type of components used for the prospect evaluation hardware 901.

The data generated by the prospect evaluation hardware 901 is transmitted to a prospect simulator model computing system 902. For example, the data may be transmitted by communication hardware 933*a* of the prospect evaluation hardware 901, which is received by communication hardware 933*b* of the prospect simulator model computing system 902.

A prospect model data memory 936 stores the data received from the prospect evaluation hardware 901. The prospect model data memory 936 may store the data as the prospect inputs including the fixed inputs and dynamic inputs, as described above. The prospect model data memory 936 may be configured as any conventional or yet-to-be-developed non-transitory structure for storing sensor data, e.g., as a random access memory (RAM), a read only memory (ROM), data registers, a database, and/or other hardware for storing sensor data.

The prospect simulator model computing system 902 further includes a prospect simulator module 930 having hardware and software suitable for executing operations on the data obtained from the prospect evaluation hardware 901. More specifically, the prospect simulator module 930 comprises one or more processors for executing specific software-based logic modules, such as, without limitation, data collecting logic, correlation matrices logic for generating correlation matrices, drilling sequence logic for determining sets of drilling sequences, Monte Carlo simulation modeling logic for modeling each drilling sequence, and an optimal drilling sequence logic for generating an optimal drilling sequence.

The prospect simulator model computing system 902 also includes a prospect simulator translation module 928 that may comprise any hardware and/or software configured to translate the output of the prospect simulator module 930 (e.g., optimal drilling sequences) into a form that can be used in control of technical operations performed by the rig-up implementation hardware 920. The prospect simulator translation module 928 may comprise a hardware driver or controller (i.e., a processor), communication hardware 935*a*, a document printer, a data display, or any other hardware that generates an operations output that can be used in the exploration and rig-up system 900 to alter, enhance, or otherwise control technical operations or create a technical effect within the exploration and rig-up system 900. The prospect simulator translation module 928 may generate executable code for controlling the rig-up implementation hardware 920 according to the optimal drilling sequence.

The optimal drilling sequence and/or executable instructions are received by data receiving hardware 935*b*, and is provided to the rig-up implementation hardware 920. The optimal drilling sequence and/or executable instructions are provided to the rig-up implementation hardware 920 for control to execute hardware 920 for completing a rig-up process. As non-limiting example, the rig-up implementation hardware 920, uses the instructions to generate control signals for autonomously operating at least some tasks of the components of the rig-up implementation hardware 920 without human intervention.

It should be understood that the components illustrated in FIG. 9 are merely illustrative and are not intended to limit the scope of this disclosure. More specifically, while the components in FIG. 9 are illustrated as residing within system 902, this is a non-limiting example. In some embodiments, one or more of the components may reside external to system 902. In some embodiments, the system 902 may exist as a virtual machine operating within a host machine alongside other virtual machines, each of which shares the same computing resources belonging to the host machine.

It should now be understood that embodiments disclosed herein include methods and systems for optimizing oil and gas exploration portfolios with geological, economical, and operational dependencies. Integrating the geological, economic, and operation variables allows for a more robust analysis of a portfolio because these variables can affect the risk and/or reward of other prospects in the portfolio that have yet to be explored. To further consider the varying degree of exploring a prospect, embodiments rank the prospects based on a Monte Carlo simulation that models all possible combinations of prospect variables utilizing random possibilities for dynamic variables. The primary result of embodiments is a risk to reward plot, which may be used to define an efficiency frontier. The efficiency frontier can act as a road map to guide users in selecting the optimal sequence of prospects to drill after every drilled prospect.

For the purposes of describing and defining the present disclosure, it is noted that reference herein to a variable being a "function" of a parameter or another variable is not intended to denote that the variable is exclusively a function of the listed parameter or variable. Rather, reference herein to a variable that is a "function" of a listed parameter is intended to be open-ended such that the variable may be a function of a single parameter or a plurality of parameters.

It is noted that recitations herein of a component of the present disclosure being "configured" or "programmed" in a particular way, to embody a particular property, or to function in a particular manner, are structural recitations, as opposed to recitations of intended use. More specifically, the references herein to the manner in which a component is "configured" or "programmed" denotes an existing physical condition of the component and, as such, is to be taken as a definite recitation of the structural characteristics of the component.

It is noted that terms like "preferably," "commonly," and "typically," when utilized herein, are not utilized to limit the scope of the claimed invention or to imply that certain features are critical, essential, or even important to the structure or function of the claimed invention. Rather, these terms are merely intended to identify particular aspects of an embodiment of the present disclosure or to emphasize alternative or additional features that may or may not be utilized in a particular embodiment of the present disclosure.

For the purposes of describing and defining embodiments of the present disclosure, it is noted that the terms "substantially" and "approximately" are utilized herein to represent the inherent degree of uncertainty that may be attributed to any quantitative comparison, value, measurement, or other representation. The terms "substantially" and "approximately" are also utilized herein to represent the degree by which a quantitative representation may vary from a stated reference without resulting in a change in the basic function of the subject matter at issue.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

Having described the subject matter of the present disclosure in detail and by reference to specific embodiments thereof, it is noted that the various details disclosed herein should not be taken to imply that these details relate to elements that are essential components of the various embodiments described herein, even in cases where a particular element is illustrated in each of the drawings that accompany the present description. Further, it will be apparent that modifications and variations are possible without departing from the scope of the present disclosure, including, but not limited to, embodiments defined in the appended claims. More specifically, although some aspects of the present disclosure are identified herein as preferred or particularly advantageous, it is contemplated that the present disclosure is not necessarily limited to these aspects.

What is claimed is:

1. A method for drilling prospects, the method comprising: generating, using a seismic source and a seismic detector, prospect inputs for a plurality of prospects, each prospect input having fixed inputs and dynamic inputs; storing the prospect inputs into a prospect model data memory; generating, using a prospect simulator module, correlation matrices based on the dynamic inputs, wherein the correlation matrices include a distance matrix that correlates a distance relationship between each pair of prospects of the plurality of prospects with a correlation factor calculated based on a cost of moving rigs between each pair of prospects; determining, using the prospect simulator module, a set of drilling sequences for the plurality of prospects based on a budget; modeling, by Monte Carlo simulation using the prospect simulator module, each drilling sequence of the set of drilling sequences within the prospect inputs, wherein: the Monte Carlo simulation uses the correlation matrices to update, for each prospect in the set of drilling sequences, prospect-specific probabilistic outcomes and operational parameters based on outcomes of previously modeled prospects, the Monte Carlo simulation produces, for each drilling sequence, risk and reward values, and each iteration of the modeling is completed when exploration constraints are reached; generating, using the prospect simulator module, an optimal drilling sequence based on the risk and reward values produced for the drilling sequences by the Monte Carlo simulation; and translating, using a prospect simulator translation module, the optimal drilling sequence for use in drilling prospects by rig-up implementation hardware; and transmitting, using the prospect simulator translation module, a translated optimal drilling sequence to the rig-up implementation hardware, wherein one or more components of the rig-up implementation hardware are autonomously operated without human intervention to enable the drilling of the plurality of prospects; and autonomously operating one or more components of the rig-up implementation hardware using the translated optimal drilling sequence to drill the plurality of prospects.

2. The method of claim 1, wherein the seismic source is one or more of a depth charge, an explosive and a thumper truck, and the seismic detector is one or more of a geophone and a hydrophone.

3. The method of claim 1, wherein the rig-up implementation hardware comprises one or more of a truck, a crane, and a forklift.

4. The method of claim 1, wherein the correlation matrices include a geological matrix that correlates a geological relationship between each pair of prospects of the plurality of prospects with a correlation factor calculated based on geological dependency of each pair of prospects.

5. The method of claim 4, wherein the geological matrix is weighted based on whether a drilled prospect is a success or a failure.

6. The method of claim 1, wherein the correlation matrices include an economic matrix that correlates a cost relationship between each pair of prospects of the plurality of prospects with a correlation factor calculated based on available infrastructure of each pair of prospects.

7. The method of claim 1, wherein the exploration constraints include at least one of a budget, a duration, and a number of rigs.

8. The method of claim 1, wherein determining the set of drilling sequences for the plurality of prospects comprises:

generating an initial set of drilling sequences by enumerating permutations of the plurality of prospects;

for each sequence in the initial set of drilling sequences, determining an expense based on a distance between a first prospect and a second prospect multiplied by a mobilization cost; and until the expense is greater than the budget, selecting a subsequent prospect of the sequence and updating the expense based on the expense, a subsequent prospect location, and the mobilization cost.

9. The method of claim 1, wherein modeling, by Monte Carlo simulation, each drilling sequence comprises:

determining a number of repetitions;

computing a probabilistic reward of a sequence for each repetition in the number of repetitions; and outputting a mean and a standard deviation of the probabilistic rewards of the sequence for the number of repetitions.

10. The method of claim 1, wherein generating the optimal drilling sequence comprises:

sorting the set of drilling sequences by their corresponding risk;

plotting the set of drilling sequences on a graph, wherein an x-axis represents risk and a y-axis represents reward;

selecting a minimum risk drilling sequence from the set of drilling sequences;

selecting a maximum reward drilling sequence from the set of drilling sequences;

interpolating a first line between the minimum risk drilling sequence and the maximum reward drilling sequence; and selecting pairs of drilling sequences above the first line having a second line interpolated therebetween that do not have drilling sequences above the second line.

11. The method of claim 1, wherein the rig-up implementation hardware comprises a rig-up truck that is autonomously controlled to orient a rig according to the optimal drilling sequence.

12. A system for drilling prospects, the system comprising: a seismic source and a seismic detector that produce data that generates prospect inputs for a plurality of prospects, each prospect input having fixed inputs and dynamic inputs;

a prospect model data memory that receives and stores the prospect inputs;

a prospect simulator module that: receives the prospect inputs from the prospect model data memory; generates correlation matrices based on the dynamic inputs, wherein the correlation matrices include a distance matrix that correlates a distance relationship between each pair of prospects of the plurality of prospects with a correlation factor calculated based on a cost of moving rigs between each pair of prospects; determines a set of drilling sequences for the plurality of prospects based on a budget; models, by Monte Carlo simulation, each drilling sequence of the set of drilling sequences within the prospect inputs, wherein: the Monte Carlo simulation uses the correlation matrices to update, for each prospect in the set of drilling sequences, prospect-specific probabilistic outcomes and operational parameters based on outcomes of previously modeled prospects, the Monte Carlo simulation produces, for each drilling sequence, risk and reward values, and each iteration of the modeling is completed when the exploration constraints are reached; and generates an optimal drilling sequence based on the risk and reward values produced for the drilling sequences by the Monte Carlo simulation; and a prospect simulator translation module that translates the optimal drilling sequence for use in drilling prospects by rig-up implementation hardware, transmits a translated optimal drilling sequence to the rig-up implementation hardware such that one or more components of the rig-up implementation hardware are autonomously operated without human intervention to enable the drilling of the plurality of prospects; and autonomously operating one or more components of the rig-up implementation hardware using the translated optimal drilling sequence to drill the plurality of prospects.

13. The system of claim 12, wherein determining the set of drilling sequences for the plurality of prospects comprises:

generating an initial set of drilling sequences by enumerating permutations of the plurality of prospects;

for each sequence in the initial set of drilling sequences, determining an expense based on a distance between a first prospect and a second prospect multiplied by a mobilization cost; and until the expense is greater than the budget, selecting a subsequent prospect of the sequence and updating the expense based on the expense, a subsequent prospect location, and the mobilization cost.

14. The system of claim 12, wherein the seismic source is one or more of a depth charge, an explosive and a thumper truck, and the seismic detector is one or more of a geophone and a hydrophone.

15. The system of claim 12, wherein the rig-up implementation hardware comprises one or more of a truck, a crane, and a forklift.

16. The system of claim 12, wherein each drilling sequence is modeled by:

determining a number of repetitions;

computing a probabilistic reward of a sequence for each repetition in the number of repetitions; and outputting a mean and a standard deviation of the probabilistic rewards of the sequence for the number of repetitions.

17. The system of claim 12, wherein the optimal drilling sequence is generated by:

sorting the set of drilling sequences by their corresponding risk;

plotting the set of drilling sequences on a graph, wherein an x-axis represents risk and a y-axis represents reward;

selecting a minimum risk drilling sequence from the set of drilling sequences;

selecting a maximum reward drilling sequence from the set of drilling sequences;

interpolating a first line between the minimum risk drilling sequence and the maximum reward drilling sequence; and selecting pairs of drilling sequences above the first line having a second line interpolated therebetween that do not have drilling sequences above the second line.

18. The system of claim 12, wherein the rig-up implementation hardware comprises a rig-up truck that is autonomously controlled to a orient a rig according to the optimal drilling sequence.

* * * * *